US010592955B2

(12) United States Patent
Jagota et al.

(10) Patent No.: US 10,592,955 B2
(45) Date of Patent: *Mar. 17, 2020

(54) BULK CONTACT RECOMMENDATIONS BASED ON ATTRIBUTE PURCHASE HISTORY

(71) Applicant: salesforce.com, inc., San Francisco, CA (US)

(72) Inventors: Arun Jagota, Sunnyvale, CA (US); Matthew Fuchs, Los Gatos, CA (US); Gregory Haardt, San Carlos, CA (US)

(73) Assignee: salesforce.com, inc., San Francisco, CA (US)

( * ) Notice: Subject to any disclaimer, the term of this patent is extended or adjusted under 35 U.S.C. 154(b) by 951 days.

This patent is subject to a terminal disclaimer.

(21) Appl. No.: 14/504,593

(22) Filed: Oct. 2, 2014

(65) Prior Publication Data

US 2015/0269647 A1  Sep. 24, 2015

Related U.S. Application Data

(60) Provisional application No. 61/969,447, filed on Mar. 24, 2014.

(51) Int. Cl.
  *G06Q 30/06* (2012.01)
  *G06Q 30/02* (2012.01)
  (Continued)

(52) U.S. Cl.
  CPC ....... *G06Q 30/0631* (2013.01); *G06Q 10/067* (2013.01); *G06Q 10/06315* (2013.01);
  (Continued)

(58) Field of Classification Search
  CPC .......... G06Q 30/0631; G06Q 30/0202; G06Q 30/0255; G06Q 30/02; G06Q 30/06;
  (Continued)

(56) References Cited

U.S. PATENT DOCUMENTS 5,577,188 A  11/1996  Zhu
5,608,872 A  3/1997  Schwartz
(Continued)

OTHER PUBLICATIONS

2014-K65705, May 2014, Derwent, Dubey et al.*
(Continued)

*Primary Examiner* — Yogesh C Garg
(74) *Attorney, Agent, or Firm* — Dergosits & Noah LLP; Todd A. Noah

(57) ABSTRACT

A system creates a graph of nodes connected by arcs, and identifies a first compound attribute associated with contacts purchased by a current user. The first compound attribute includes a first attribute associated with a first value and a second attribute associated with a second value. The system identifies a directed arc from a first node to a second node. The directed arc is associated with a probability that previous users who purchased a first contact associated with the first compound attribute also purchased a second contact associated with a second compound attribute. The second compound attribute includes the first attribute, associated with a third value which matches the first value, and the second attribute, associated with a fourth value, which lacks a match with the second value. The system outputs a recommendation for the current user to purchase contacts associated with the second compound attribute if the probability exceeds a threshold.

20 Claims, 6 Drawing Sheets

(51) Int. Cl.
*G06Q 30/00* (2012.01)
*G06Q 10/06* (2012.01)
*G06Q 40/00* (2012.01)
*G06Q 10/10* (2012.01)

(52) U.S. Cl.
CPC ......... *G06Q 10/103* (2013.01); *G06Q 10/105* (2013.01); *G06Q 30/00* (2013.01); *G06Q 30/02* (2013.01); *G06Q 30/0202* (2013.01); *G06Q 30/0235* (2013.01); *G06Q 30/0255* (2013.01); *G06Q 30/06* (2013.01); *G06Q 40/00* (2013.01)

(58) Field of Classification Search
CPC .. G06Q 30/0235; G06Q 30/00; G06Q 10/103; G06Q 10/105; G06Q 10/06315; G06Q 10/067; G06Q 40/00
USPC .................. 705/26.7, 26.1, 27.1, 27.2, 26.62
See application file for complete search history.

(56) References Cited

U.S. PATENT DOCUMENTS

| | | | |
|---|---|---|---|
| 5,634,113 A * | 5/1997 | Rusterholz | G06F 17/509 |
| | | | 716/106 |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,113,917 B2 * | 9/2006 | Jacobi | G06Q 30/02 |
| | | | 705/14.53 |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,720,720 B1 * | 5/2010 | Sharma et al. | G06Q 30/0631 |
| | | | 705/26.7 |
| 7,779,475 B2 | 8/2010 | Jakobson et al. | |
| 7,851,004 B2 | 12/2010 | Hirao et al. | |
| 7,881,984 B2 | 2/2011 | Kane, Jr. et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,417,715 B1 * | 4/2013 | Bruckhaus | G06F 17/30994 |
| | | | 705/26.1 |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,688,536 B2 * | 4/2014 | Singh et al. | G06Q 30/02 |
| | | | 705/26.1 |
| 8,799,096 B1 * | 8/2014 | Dillon | G06Q 30/02 |
| | | | 705/26.1 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0116237 A1 * | 8/2002 | Cohen | G06Q 10/04 |
| | | | 705/7.13 |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0174165 A1 * | 9/2003 | Barney | G06T 11/206 |
| | | | 715/747 |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |

(56) References Cited

U.S. PATENT DOCUMENTS

| | | |
|---|---|---|
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0133343 A1* | 6/2008 | Hyder et al. ........... G06Q 10/06 705/321 |
| 2009/0063415 A1 | 3/2009 | Chatfield et al. |
| 2009/0070230 A1* | 3/2009 | Silverstein ............ G06Q 20/04 705/26.1 |
| 2009/0100342 A1 | 4/2009 | Rueben et al. |
| 2009/0177744 A1 | 7/2009 | Marlow et al. |
| 2009/0198509 A1* | 8/2009 | Dumoff .......... G06Q 10/063112 705/2 |
| 2010/0274594 A1* | 10/2010 | Virdhagriswaran ... G06Q 10/10 705/4 |
| 2012/0078747 A1* | 3/2012 | Chakrabarti ....... G06Q 30/0601 705/26.7 |
| 2012/0233137 A1 | 9/2012 | Jakobson et al. |
| 2013/0066676 A1 | 3/2013 | Williams et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0268302 A1* | 10/2013 | Jayaram ................. G06Q 30/06 705/5 |
| 2014/0115064 A1* | 4/2014 | Calman .................. G06Q 30/06 709/205 |
| 2014/0317038 A1* | 10/2014 | Mojsilovic ............ G06Q 10/00 706/46 |
| 2015/0088685 A1* | 3/2015 | Tishkevich ............ G06Q 30/02 705/26.7 |

OTHER PUBLICATIONS

U.S. Appl. No. 13/998,890.
U.S. Appl. No. 13/987,075.
U.S. Appl. No. 13/987,074.
U.S. Appl. No. 13/998,065.
U.S. Appl. No. 13/986,744.
U.S. Appl. No. 13/986,251.

* cited by examiner

BULK CONTACT RECOMMENDATIONS BASED ON ATTRIBUTE PURCHASE HISTORY

CLAIM OF PRIORITY

This application claims the benefit of U.S. Provisional Patent Application No. 61/969,447 entitled, SYSTEM AND METHOD FOR CONTACT RECOMMENDATIONS VIA PURCHASE HISTORY, by Jagota, et al., filed Mar. 24, 2014, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database system may use market basket analysis to create association rules in the form of X→Y, where X and Y are disjoint sets of items. Such association rules may be used for making recommendations based on a sufficiently high confidence P(Y|X), which has the interpretation "the probability of Y given X i.e., of the transactions in which at least all of the items in X were purchased, in P(Y|X) of them all the items in Y were also purchased." A high confidence association rule may be used to recommend Y when a user purchases X in the same ecommerce basket or shopping cart. However, even when a database system has basket data available, some basket sizes may be much larger than basket sizes used in typical ecommerce settings. For example, a user may purchase the information for several thousand business contacts in a single transaction, in contrast to typical ecommerce shopping baskets which usually contain less than 30 items.

BRIEF SUMMARY

In accordance with embodiments, there are provided systems and methods for bulk contact recommendations based on attribute purchase history. A directed graph of nodes is created, in which at least some of the nodes are connected by directed arcs. A first compound attribute associated with contacts purchased by a current user is identified, wherein the first compound attribute includes a first attribute associated with a first value and a second attribute associated with a second value. A directed arc from a first node to a second node is identified, wherein the directed arc is associated with a conditional probability that previous users who purchased a first contact associated with the first compound attribute also purchased a second contact associated with a second compound attribute, wherein the second compound attribute includes the first attribute, which is associated with a third value which matches the first value, and the second attribute, which is associated with a fourth value which lacks a match with the second value. A recommendation for the current user to purchase contacts associated with the second compound attribute is output if the conditional probability exceeds a probability threshold.

For example, a database system creates many different directed graphs of nodes, wherein many nodes are connected by directed arcs for each directed graph. The database system identifies a first compound attribute associated with contacts purchased by a current user, wherein the first compound attribute includes a job title level and industry attribute associated with an executive level biotech contacts value and a city attribute associated with a San Francisco value. The database system identifies a directed arc from a first node associated with the city of San Francisco to a second node associated with the city of South San Francisco in a directed graph of executive level biotech contacts, wherein the directed arc is associated with a conditional probability that previous users who purchased a contact associated with the executive level biotech contacts in the city of San Francisco also purchased a contact associated with executive level biotech contacts in the city of South San Francisco. The database system outputs a recommendation for the current user to purchase executive level biotech contacts in the city of South San Francisco if the conditional probability is sufficiently high that previous users who purchased a contact associated with the executive level biotech contacts in the city of San Francisco also purchased a contact associated with executive level biotech contacts in the city of South San Francisco.

While one or more implementations and techniques are described with reference to an embodiment in which bulk contact recommendations based on attribute purchase history is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for bulk contact recommendations based on attribute purchase history. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, mechanisms and methods for bulk contact recommendations based on attribute purchase history will be described with reference to example embodiments. The following detailed description will first describe a method for bulk contact recommendations based on attribute purchase history. Next, block diagrams of example portions of directed graphs for bulk contact recommendations based on attribute purchase history are described. Then the detailed description will describe another method for bulk contact recommendations based on attribute purchase history. Following, a block diagram of an example portion of another directed graph for bulk contact recommendations based on attribute purchase history is described.

Figure 1:
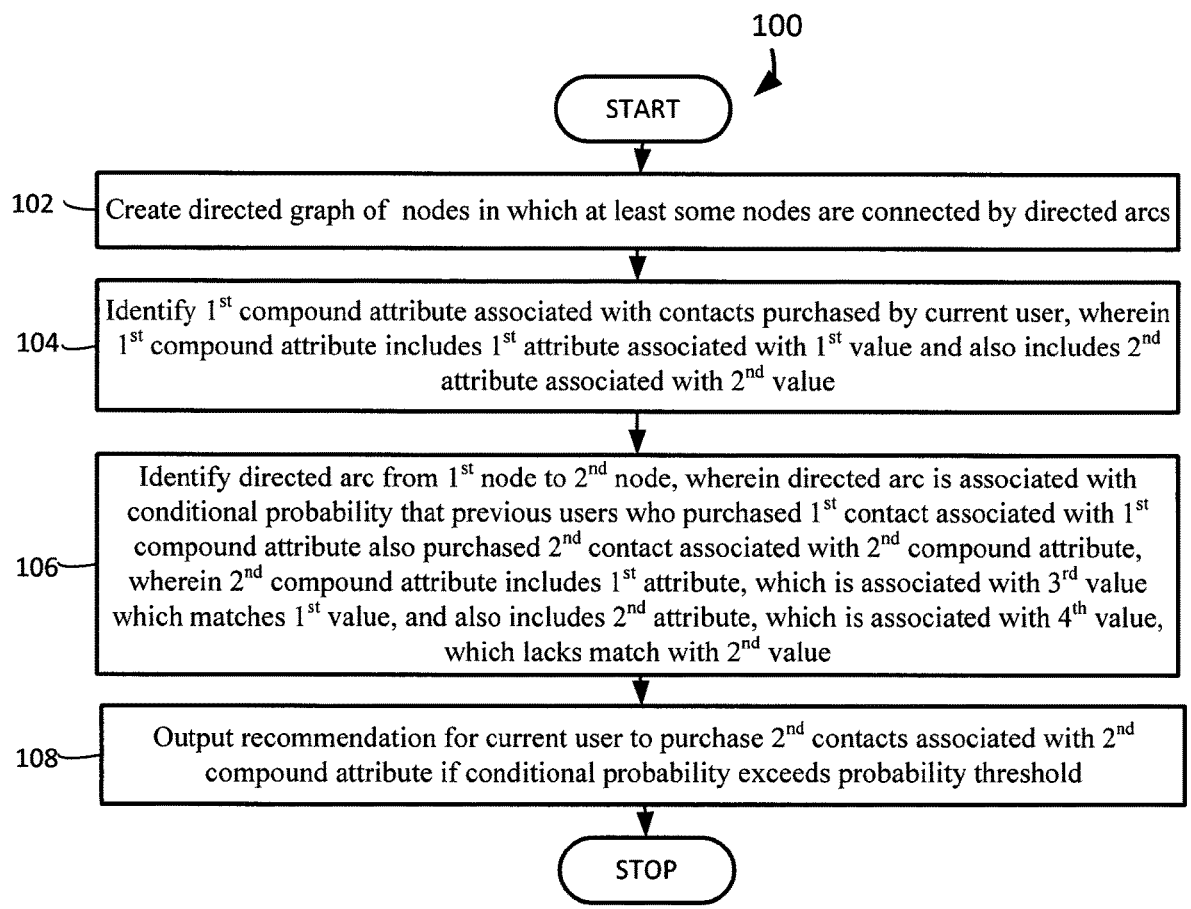
FIG. 1 is an operational flow diagram illustrating a high level overview of a method for bulk contact recommendations based on attribute purchase history, in an embodiment.

FIG. 1 is an operational flow diagram illustrating a high level overview of a method 100 for bulk contact recommendations based on attribute purchase history. As shown in FIG. 1, a database system may recommend bulk contacts based on attribute purchase history.

Figure 2:
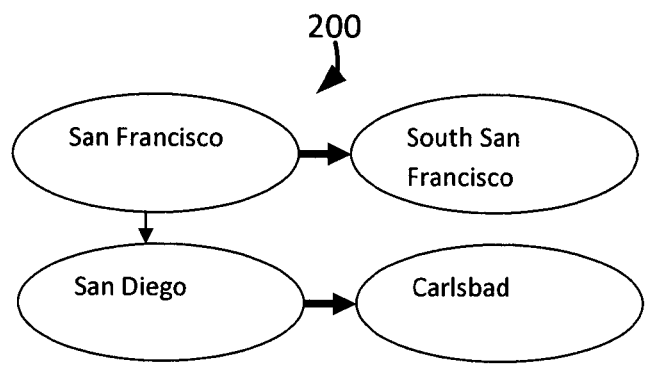
FIG. 2 is a block diagram of an example portion of a directed graph for bulk contact recommendations based on attribute purchase history, in an embodiment.

A database system creates a directed graph of nodes, wherein at least some of the nodes are connected by directed arcs, block 102. For example and without limitation, this can include the database system creating many different directed graphs of nodes, including a directed graph of executive level biotech contacts, wherein at least some of the nodes are connected by directed arcs in the directed graph of executive level biotech contacts. An example portion of such a directed graph is depicted in FIG. 2 and described below in the description of FIG. 2. The number of outgoing directed arcs from a node may be limited to a maximum number of outgoing directed arcs based on a corresponding conditional probability associated with each potential outgoing directed arc. For example, generating directed arcs between tens of thousands of nodes in a directed graph may be time-consuming and inefficient, such that the database system may cap the number of outgoing directed arcs to some constant which limits the number of outgoing directed arcs from each node to those directed arcs with the highest probabilities of purchasing another contact.

Having created at least one directed graph, the database system identifies a first compound attribute associated with contacts purchased by a current user, wherein the first compound attribute includes a first attribute associated with a first value and a second attribute associated with a second value, block 104. By way of example and without limitation, this can include the database system identifying a compound attribute associated with contacts purchased by a current user, wherein the compound attribute includes a job title level and industry attribute associated with an executive level biotech contacts value and a city attribute associated with a San Francisco value. An example portion of a directed graph based on an attribute associated with an executive level biotech contacts value and also based on another attribute associated with city values that include the city of San Francisco is depicted in FIG. 2 and referenced below in the description of FIG. 2. The first attribute may include a third attribute and a fourth attribute, and the first value may include a fifth value associated with the third attribute and may also include a sixth value associated with the fourth attribute. For example, the first attribute includes a contact job title level attribute and a contact industry attribute, and the first value includes the value executive level for the contact job title level attribute and the value biotech industry for the contact industry attribute. Any attribute may be composed of multiple sub-attributes, and any attribute may be a sub-attribute for another attribute.

After identifying a compound attribute associated with contacts purchased by a current user, the database system identifies a directed arc from a first node to a second node, wherein the directed arc is associated with a conditional probability that previous users who purchased a first contact associated with the first compound attribute also purchased a second contact associated with a second compound attribute, wherein the second compound attribute includes the first attribute, which is associated with a third value which matches the first value, and the second attribute, which is associated with a fourth value, which lacks a match with the second value, block 106. In embodiments, this can include the database system identifying a directed arc from a first node associated with the city of San Francisco to a second node associated with the city of South San Francisco in the directed graph of executive level biotech contacts, wherein the directed arc is associated with a conditional probability that previous users who purchased a contact associated with the executive level biotech contacts in the city of San Francisco also purchased a contact associated with executive level biotech contacts in the city of South San Francisco. An example portion of a directed graph for executive level biotech contacts which includes nodes for the cities of San Francisco and South San Francisco is depicted in FIG. 2 and referenced in the description of FIG. 2.

The conditional probability that previous users who purchased contacts associated with a specific attribute also purchased other contacts associated with another attribute may be adjusted for purchase recency. For example, a previous user recently purchasing executive level biotech contacts for the city of San Francisco and shortly thereafter purchasing executive level biotech contacts for the city of South San Francisco results in a higher conditional probability than the conditional probability based on a previous user purchasing executive level biotech contacts for the city of San Francisco many years ago followed years later by purchasing executive level biotech contacts for the city of South San Francisco. Details of using purchase recency to calculate historical probability are provided below following the description of FIG. 5.

Figure 3:
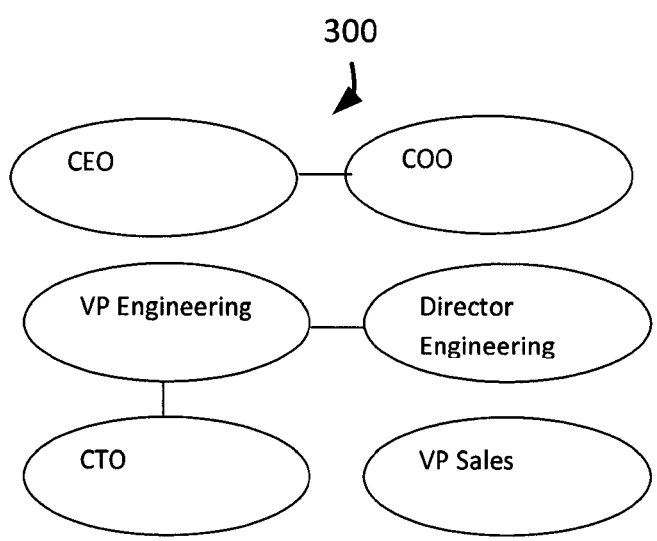
FIG. 3 is a block diagram of an example portion of another directed graph for bulk contact recommendations based on attribute purchase history, in an embodiment.

A value may match another value based on the value equaling the other value and/or a similarity score equating the value with the other value. For example, the value "Vice President" for the biotech industry obviously matches the value "Vice President" for the biotech industry, but may also match the value "Director" for the biotech industry and the value "CEO" for the biotech industry because similarity scores equate the job title levels of "Vice President," "Director," and "CEO." An example portion of a directed graph which includes nodes for the similarity scores applied to job title levels is depicted in FIG. 3 and referenced in the description of FIG. 3.

After identifying directed arcs associated with conditional probabilities, the database system outputs a recommendation for the current user to purchase contacts associated with the second compound attribute if the conditional probability exceeds a probability threshold, block 108. For example and without limitation, this can include the database system outputting a recommendation for the current user to purchase executive level biotech contacts in the city of South San Francisco if the conditional probability is sufficiently high that previous users who purchased a contact associated with the executive level biotech contacts in the city of San Francisco also purchased a contact associated with executive level biotech contacts in the city of South San Francisco. The probability threshold may be based on a pre-determined threshold value and/or based on another conditional probability that previous users who purchased the first contact associated with the first compound attribute also purchased a third contact associated with a third compound attribute, wherein the third compound attribute includes the first attribute, which is associated with a seventh value which matches the first value, and also includes the second attribute, which is associated with an eighth value, which lacks a match with the second value. For example, the database system outputs a recommendation for the current user to purchase executive level biotech contacts in the city of South San Francisco because the conditional probability that previous users who purchased a contact associated with the executive level biotech contacts in the city of San Francisco also purchased a contact associated with executive level biotech contacts in the city of South San Francisco is the only conditional probability that is greater than 0.5. In another example, the database system outputs a recommendation for the current user to purchase executive level biotech contacts in the city of South San Francisco because the conditional probability that previous users who purchased a contact associated with the executive level biotech contacts in the city of San Francisco also purchased a contact associated with executive level biotech contacts in the city of South San Francisco is greater than the conditional probabilities for purchasing a contact associated with executive level biotech contacts in all other cities. The database system may output a recommendation for the current user to purchase any number of sets of contacts associated with any number of compound attributes if the corresponding conditional probabilities exceeds a probability threshold.

The method 100 may be repeated as desired. Although this disclosure describes the blocks 102-108 executing in a particular order, the blocks 102-108 may be executed in a different order. In other implementations, each of the blocks 102-108 may also be executed in combination with other blocks and/or some blocks may be divided into a different set of blocks.

The database system may model, for any given attribute A of a contact, $P(A=w|A=v)$, the probability that someone who buys a contact whose attribute A has value v will also buy a contact whose attribute A has value w. The database system estimates such probabilities from actual purchase data, but w could equal v. The attribute A can be a composite attribute, composed of multiple primitive attributes. An example of such an attribute is (rank, department, city), for which strong correlations between its values may be expected because people who buy contacts in a certain rank, department, and city may also be likely to buy other contacts in the same or similar ranks, departments, and cities.

If a user u has bought contacts having a certain property A=v, and the database system's analysis shows that people who buy contacts with A=v also buy contacts with A=w, the database system recommends contacts with A=w to the user u. For example, if people who buy contacts in the biotech industry in the city of San Francisco also buy contacts in the biotech industry in the city of San Diego, the database system recommends contacts in the biotech industry in the city of San Diego when someone buys a contact in the biotech industry in the city of San Francisco.

Specifically, for any two values v and w of an attribute A, a directed similarity score S(A,v,w) is defined to be monotone in the percentage of those people who have bought contacts with attribute A having value v who have also bought contacts having value w of attribute A. The qualifier "directed" here means that S(A,v,w) could be different from S(A,w,v).

When a user's search term for contacts includes a property A=v, the database system can show other facets along with the results for various A=w where $P(A=w|A=v)$ is sufficiently high. A specific contact recommendation scheme may be broadly similar, but there are key differences at a deeper level. A specific contact scheme recommends specific contacts, which may be attractive for sales people, who may prefer such specific recommendations. On the other hand, a specific contact recommender may be unable to make recommendations for contacts not having much purchase history. In contrast, the attribute-based bulk contact scheme results in making bulk recommendations. That is, if user u has bought a contact with attribute A having value v, such as executive level biotech contacts in the city of San Francisco, the database system may recommend for this user to purchase many executive level biotech contacts in the city of San Diego. Bulk recommendations such as these are especially of interest to marketing people. The bulk recommendation scheme is likely to have significantly higher recall than a specific contact recommendation scheme because the bulk scheme recommends based on properties of contacts, whereas a specific scheme needs sufficient co-purchase history over individual pairs of contacts.

The model used is a directed graph. A node i represents a property, such as a specific value v for a certain attribute A. There is an arc from node i to node j with weight $P(j|i)$ on it, where $P(j|i)$ is the probability that someone who buys i also buys j. Here "buys i" means "buys a contact with property i". Each node i in the directed graph also has probability $P(i)$ on it, where $P(i)$ is the probability of i being bought.

Let A denote an attribute of a contact, over whose values the database system forms the directed graph, with the nodes of the graph corresponding to particular values of A. $P(A=w|A=v)$ is the weight of the arc, if it exists, from node $A=v$ to node $A=w$. This model is trained from a set of $(u,c,t,A=v)$ tuples, denoting "user u bought contact c at time t having property $A=v$". A model built on such properties can ignore the contact c in such tuples. The database system estimates the parameters, such as probabilities $P(A=v)$ and $P(A=w|A=v)$, of the model. That is, $P(A=v)$ is estimated as the fraction of all tuples in which A equals v, and $P(A=w|A=v)$ as the fraction of those users who bought a contact with $A=v$ who also bought a contact with $A=w$. The recency-weighted variant, described below, can be used as an alternative, and/or as a supplement.

An alternative approach is to train the model parameters from basket data, if available, rather than non-basket bought data. $P(A=vi|A=w)$ would be estimated as: $|\{u,C,t|C$ contains at least one contact with $A=w\}|$ divided by $|\{(u,C,t)|C$ contains at least one contact with $A=vi$ and at least one contact with $A=w\}|$ That is, $P(A=vi|A=w)$ is estimated as the fraction of baskets (transactions) containing at least one contact with attribute $A=w$ that also contain at least one contact with attribute $A=vi$. $P(A=w)$ is estimated as the number of baskets containing at least one contact with $A=w$ divided by the total number of baskets.

Once a directed graph has been trained, recommendations for a given $A=v$ may be ranked in non-increasing order of the probabilities $P(A=w|A=v)$, or of lifts. For example, the database system is to recommend for people who have bought executive level contacts in the biotech industry properties of other contacts that have been co-bought. For this purpose, the attribute A is defined as rank=(C level or VP level or Director level) AND industry=biotech AND city. Note that city is the only variable in the attribute A.

The database system may make more accurate recommendations when the database system knows that the user has bought contacts with multiple values of attribute A and wants to score v1, v2, . . . vk the efficacy of recommending a contact having value $A=w$. As an example, a user may have bought contacts in the biotech industry in some cities in California, but none on the East Coast, so it would seem that recommending more in California makes sense. Perhaps the user is interested only in the biotech industry in California. The model below generalizes even a bit beyond this, as it allows the database system to use the counts of how many contacts the user has bought of values v1, v2, . . . vk of attribute A respectively. Specifically, it models the efficacy of a recommendation $A=w$ for a user whose has previously bought n1, n2, . . . nk contacts having properties $A=v1$, $A=v2$, . . . ,$A=vk$ respectively. Using Bayes rule under the conditional independence assumption:

$$P(A=w|A=v1 \text{ with count } n1, A=v2 \text{ with count } n2, \ldots, A=vk \text{ with count } nk) = P(A=v1|A=w)^{n1} * P(A=v2|A=w)^{n2} * \ldots * P(A=vk|A=w)^{nk} * P(A=w)/C \quad (1)$$

where $C=P(A=v1$ with count n1, $A=v2$ with count n2, . . . , $A=vk$ with count nk). C can be ignored as usual since w does not depend on it. That is, various candidates $A=w$ can be ranked simply on the numerator of the Bayes rule equation. If count data is unavailable, the database system does the following. The database system wants $$P(A=w|A=v1 \text{ with count } >=1, A=v2 \text{ with count} >= 1, \ldots, A=vk \text{ with count} >=1).$$

The database system approximates this by $P(A=w|A=v1$ with count 1, $A=v2$ with count 1, . . . , $A=vk$ with count 1), which is a special case of the Bayes Rule equation.

FIG. 2 illustrates a block diagram of an example portion of a directed graph 200 for bulk contact recommendations based on attribute purchase history, under an embodiment. The example portion of the directed graph 200 may be learned from suitable purchase data. The arcs denote directed relationships with high probability on them, and bolder arcs have higher probabilities. The node name is the name of the city in the attribute A. The example portion of the directed graph 200 is for the attribute A with rank=executive level and industry=biotech.

The lift, $l(A=v, A=w) = P(A=w|A=v)/P(A=w)$, may be interpreted as a similarity measure of how related $A=v$ and $A=w$ are. Values of $l(A=v,A=w)$ much greater than, or much less than, 1 mean that people who buy contacts with $A=v$ also buy contacts with $A=w$ much more often than, or much less often than, would be expected by chance. In view of this, $l(A=v,A=w)$ may also be interpreted as a measure of similarity between $A=v$ and $A=w$.

If the attribute A includes a value for job title, the database system may create a directed graph whose nodes are specific job titles. The directed graph's parameters node and arc probabilities are estimated exactly as in earlier sections. $P(A=t)$ is a measure of how popular title t is, from the perspective of buyers of contacts. $l(A=t1,A=t2)$ is a measure of how similar two titles are, from the point of view of being bought together.

FIG. 3 illustrates a block diagram of an example portion of another directed graph 300 for bulk contact recommendations based on attribute purchase history, under an embodiment. FIG. 3 depicts an example portion of a directed graph for how similar two job titles are, from the point of view of being purchased together. The edges denote pairs of job titles that have high lift, which are deemed similar; while non-edges denote pairs of job titles that have low lift; which are deemed dissimilar.

A variant of the related job titles directed graph is the related title words graph, in which the nodes of this directed graph are distinct words. After a directed graph has been trained from purchase data in the way described above, the parameters of the directed graph have the following interpretation. The probability $P(w)$ on the graph node having the word w is the fraction of contact purchases in whose title the word w appears. The lift $l(u,v)$ of the pair of nodes containing words u and v is $P(v|u)/P(v)$. Values of $l(u,v)$ much greater than, or much less than, 1 mean that people who buy contacts with word u in the title also buy contacts with word v in the title much more often than, or much less often than, would be expected by chance. For example, the words Attorney and Legal are not very common, such that in the directed graph's terms, P(attorney) and P(legal) are both low. However, the database system expects P(attorney|legal) to be much higher than P(attorney). That is, while the database system expects that the probability that a random buyer will buy a contact with the word attorney in it to be low, the database system expects P(attorney|legal) to be much higher. In short, while a random buyer is unlikely to be interested in attorneys, a buyer who is interested in contacts with attorney in the title is also likely to be interested in contacts with legal in the title. The mechanism of modeling attribute-value similarity pairs in a graph lends itself to identifying groups, such as, clusters of pairwise-similar attribute-value items using graph clustering techniques, such as connected components clustering, cliques partition clustering, Markov Cluster Algorithm and others.

For bulk contact recommendations, the database system may train a directed graph from search data, if available, rather than, or in addition to, from purchase data. That is, if the database system has a lot of data available of the form "people who searched for contacts with the attribute A=v also searched for, or clicked on, contacts with the attribute A=w." Using such data to train a directed graph might deliver more accurate facets than using only purchase data.

While the examples described, such as industry=biotech, city=San Francisco, used compound attributes, the database system's method is applicable to both simple and compound attributes. A property is a particular tuple of values for a compound attribute or a single value for a attribute that is not compound. For example, (industry=biotech, city=San Francisco) may be described as the property "city is San Francisco and industry is biotech.: Also, a property corresponds to exactly one node in the directed graph. Working with large candidate sets combined with multiple purchase sets substantially increases the computational complexity of market basket analysis. Even a fast algorithm slows down immensely on large candidate sets because even if the database system seeks association rules X→Y in which |X| is small, such as n=3, a basket of size m has "m choose n" subsets of cardinality n each, each of which necessarily has to be enumerated. For example, a user purchased executive level biotech contacts for a certain city A, executive level biotech contacts for another city B, and executive level biotech contacts for a third city F. To be able to directly calculate the probability $P(X|\{A, B, \text{ and } F\})$ whenever needed for any user having purchased the sets of contacts $\{A, B, \text{ and } F\}$, the database system would have to compute $P(X|\{A, B, \text{ and } F\})$ for every quadruplet $\{A, B, F, X\}$. The data storage could be restricted to the highest scoring X's, such as the top 20 X's, for any given sets $\{A, B, \text{ and } F\}$ of contacts. Even then, the number of triplets $\{A, B, F\}$ could be extremely large. If data storage stores 30,000 sets of contacts representing the 30,000 cities in the United States, then the number of triplets of these 30,000 sets of contacts is of the order 30,000 raised to the power of 3, or 27 trillion.

Figure 4:
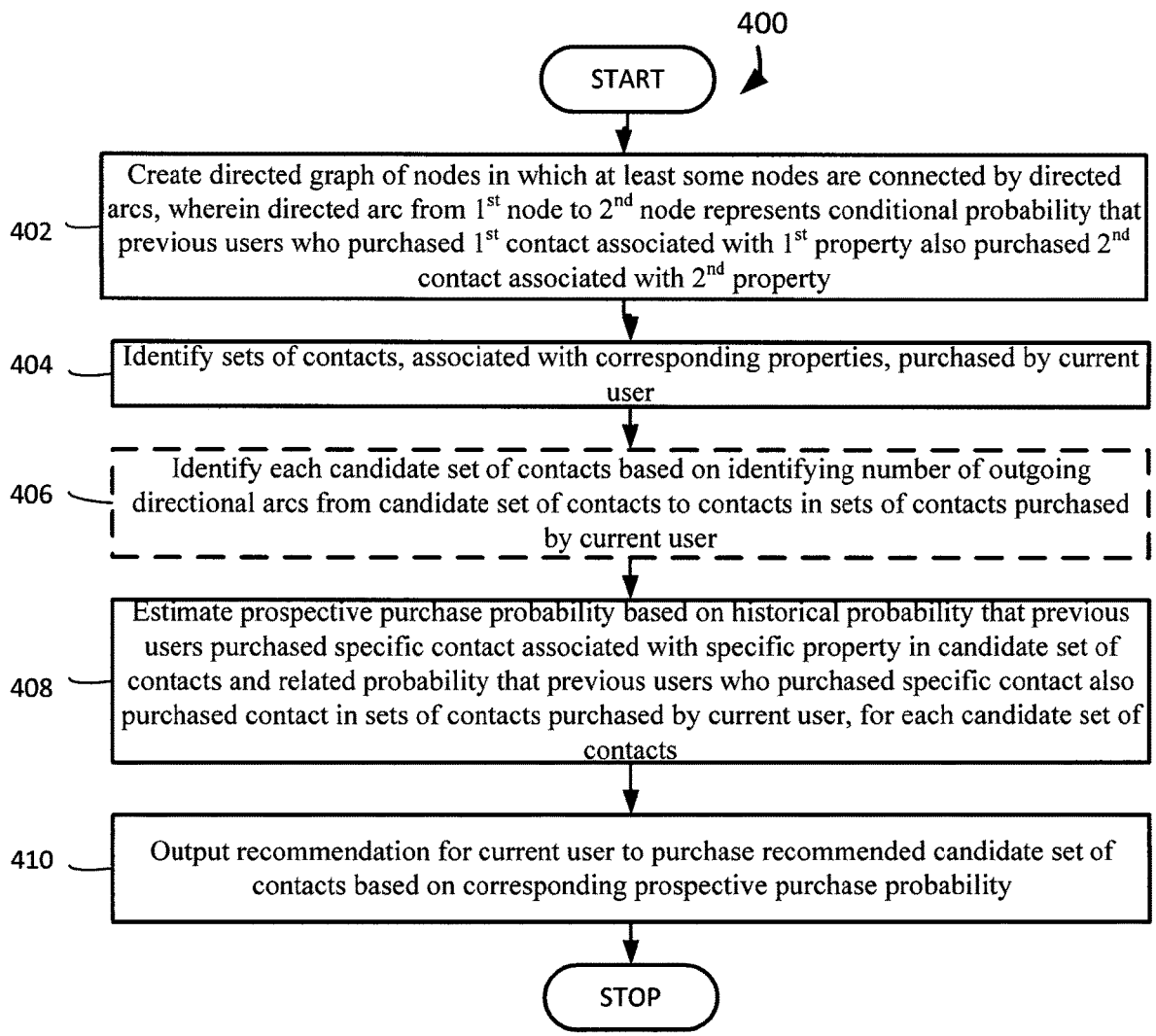
FIG. 4 is an operational flow diagram illustrating a high level overview of another method for bulk contact recommendations based on property purchase history, in an embodiment.

FIG. 4 is an operational flow diagram illustrating a high level overview of another method 400 for bulk contact recommendations based on property purchase history. As shown in FIG. 4, a database system may recommend bulk contacts based on property purchase history.

Figure 5:
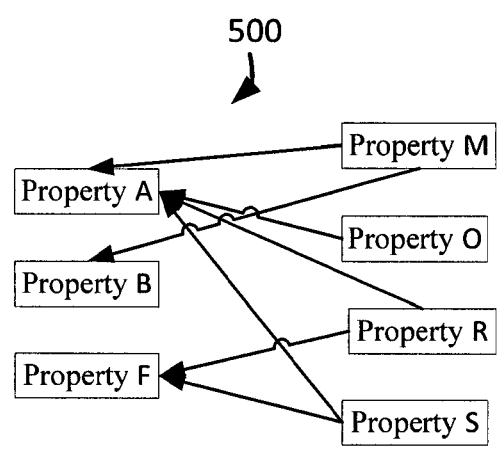
FIG. 5 is a block diagram of an example portion of yet another directed graph for bulk contact recommendations based on property purchase history, in an embodiment.

A database system creates a directed graph of nodes in which at least some of the nodes are connected by directed arcs, wherein a directed arc from a first node to a second node represents a conditional probability that previous users who purchased a first contact associated with a first property also purchased a second contact associated with a second property, block 402. For example and without limitation, this can include the database system creating multiple directed graphs of nodes, including a directed graph for executive level biotech contacts, in which some of the nodes are connected by arcs which represent corresponding probabilities that previous users who purchased contacts with properties represented by nodes where directed arcs begin also purchased other contacts with properties represented by nodes where directed arcs end. An example portion of such a directed graph is depicted in FIG. 5 and described below in the description of FIG. 5. The number of outgoing directed arcs from a node may be limited to a maximum number of outgoing directed arcs based on a corresponding conditional probability associated with each potential outgoing directed arc. For example, generating directed arcs between tens of thousands of nodes in a directed graph may be time-consuming and inefficient, such that the database system may cap the number of outgoing directed arcs to some constant, which limits the number of outgoing directed arcs from each node associated with a corresponding property to those directed arcs with the highest probabilities of purchasing another contact associated with another corresponding property.

Having created at least one directed graph, the database system identifies sets of contacts, associated with corresponding properties, purchased by a current user, block 404. By way of example and without limitation, this can include the database system identifying the sets $\{A, B, \text{ and } F\}$ of properties of contacts purchased by a current user. An example portion of a directed graph which includes the sets $\{A, B, \text{ and } F\}$ of properties of contacts is depicted in FIG. 5 and referenced below in the description of FIG. 5. After identifying a current user's purchase of sets of properties of contacts, the database system optionally identifies each candidate set of properties of contacts based on identifying a number of outgoing directed arcs from a candidate set of properties of contacts to a set of properties of contacts in the sets of properties of contacts purchased by the current user, block 406. In embodiments, this can include the database system identifying candidate contacts for executive level biotech contacts in the city of Modesto (M), executive level biotech contacts in the city of Oakland (O), executive level biotech contacts in the city of Riverside (R), and executive level biotech contacts in the city of San Jose (S), based on identifying at least one outgoing directed arc from each of the candidate sets $\{M, O, R, \text{ and } S\}$ of properties of contacts to the sets $\{A, B, \text{ and } F\}$ of properties of contacts. An example portion of a directed graph which includes the candidate sets $\{M, O, R, \text{ and } S\}$ of properties of contacts is depicted in FIG. 5 and referenced in the description of FIG. 5. An algorithm for identifying candidate sets of properties of contacts is provided below following the description of FIG. 5.

After identifying a candidate set of properties of contacts, the database system estimates a prospective purchase probability based on a historical probability that previous users purchased a specific contact associated with a specific property in a candidate set of properties of contacts and a related probability that previous users who purchased the specific contact associated also purchased a contact in the sets of properties of contacts purchased by the current user, for each candidate set of properties of contacts, block 408. For example and without limitation, this can include the database system estimating a prospective purchase probability based on a historical probability that previous users purchased a specific contact, such as 1% of previous users purchased contacts with the property value M, and a related probability that previous users who purchased this specific contact also purchased a contact in the sets of properties of contacts purchased by the current user, such as 10% of previous users who purchased contacts with the property value M also purchased contacts with the property value A, for each candidate set of properties of contacts.

Although the database system attempts to estimate the likelihood that the current user who purchased the sets $\{A, B, \text{ and } F\}$ of properties of contacts will also purchase the candidate set of properties of contacts with the property value M, the database system does not attempt to directly calculate the probability $P(M|\{A, B, \text{ and } C\})$. Instead, the database system bases estimates on the related probabilities for the candidate set of properties of contacts associated with the relatively few incoming directed arcs to the sets of properties of contacts purchased by the current user. The incoming directed arcs provide related probabilities that previous users who purchased a specific contact in a candidate set of properties of contacts also purchased a contact in the sets of properties of contacts purchased by the current user. Using the current example, instead of estimating P(M|{A, B, and F}), the probability of purchasing contacts in the candidate set of properties of contacts with the property value M given that the sets {A, B, and F} of properties of contacts is already purchased, the database system estimates P({A, B, and F} |M), the probability of purchasing contacts in the sets {A, B, and F} of properties of contacts given that a contact in the candidate set of properties of contacts with the property value M is purchased. In this example, the database system estimates the probability that the current owner who purchased the sets {A, B, and F} of properties of contacts also purchases the candidate contact M based on the equation P(M|{A, B, and F})=P(M)*P(A|M), *P(B|M), *P(F|M)/P({A, B, and F}). This equation is read as the probability that M is purchased given that the sets {A, B, and F} of properties of contacts are purchased is proportional to the probability that M is purchased multiplied by the probability that A is purchased given that M is purchased multiplied by the probability that B is purchased given that M is purchased multiplied by the probability that F is purchased given that M is purchased divided by the probability that A, B, and F are purchased. Since the directed graph likely does not have all possible arcs (otherwise it might be too large), an arc from M to A, B, and/or F might be absent. In this situation, the database system completes the equation by substituting the probability that a contact in a set of properties of contacts is purchased for the probability that a contact is purchased given that a candidate set of properties of contacts is purchased. In the current example, the database system would substitute P(B) for P(B|M) in the equation described above. The mathematical basis for such equations is provided in detail below following the description of the method 400.

The counter-intuitive use of incoming directed arcs easily enables the database system to estimate the probability that a user who purchased sets of properties of contacts will also purchase a candidate set of properties of contacts. The incoming directed arcs to the sets of properties of contacts in the purchased sets of properties of contacts already exist, the number of directed arcs may already be limited to a reasonable number for each candidate set of properties of contacts, and the vast number of candidate sets of properties of contacts in a typical contact database enables the database system to recommend a significant number of candidate sets of properties of contacts. Furthermore, the incoming directed arcs to the sets of properties of contacts in the purchased sets of properties of contacts already identifies significant associations that already exist between the purchased sets of properties of contacts and the candidate sets of properties of contacts, associations which the database system may use to estimate prospective purchase probabilities.

The database system uses the historical probability that previous users purchased a specific contact to estimate a prospective purchase probability for each specific candidate set of properties of contacts, thereby taking into account the general purchase popularity for each specific candidate set of properties of contacts by all previous users. The historical probability that previous users purchased contacts in each specific candidate set of properties of contacts may be adjusted for purchase recency. For example, a previous user recently purchasing a contact in the purchased sets of properties of contacts and shortly thereafter purchasing a contact in a candidate set of properties of contacts results in a higher historical probability than the historical probability based on a previous user purchasing a contact in the purchased sets of contact many years ago followed years later by purchasing a contact in a candidate set of properties of contacts. Details of using purchase recency to calculate historical probability are provided below following the description of FIG. 5.

After estimating a prospective purchase probability for each candidate set of properties of contacts, the database system outputs a recommendation for the current user to purchase a recommended candidate set of properties of contacts based on a corresponding prospective purchase probability, block 410. By way of example and without limitation, this can include the database system outputting a recommendation for the current user to purchase the recommended candidate sets {O, R, and S} of properties of contacts based on the corresponding prospective purchase probabilities for the candidate sets {O, R, and S} of properties of contacts. An algorithm for recommending candidate sets of properties of contacts, as applied to the candidate sets {M, O, R, and S} of properties of contacts, is provided below following the description of FIG. 5.

The method 400 may be repeated as desired. Although this disclosure describes the blocks 402-410 executing in a particular order, the blocks 402-410 may be executed in a different order. In other implementations, each of the blocks 402-410 may also be executed in combination with other blocks and/or some blocks may be divided into a different set of blocks.

A database system may estimate the probability P(j|C) that a user who has purchased all of the contacts in given sets C will also purchase the set of candidate contacts j, which is not in the sets C, in order to recommend to the user to purchase the candidate set of properties of contacts j. The database system may identify a candidate set of properties of contacts j not in the sets C that have high a P(j|C).

Purchase data may be available in one of two forms, basket data and non-basket purchased data. Basket data is a set of (u,C,t) triples denoting "the user u purchased the sets C of properties of contacts at the time t," in which each triple is a transaction. Non-basket purchased data is a set of (u,c,t) triples denoting "the user u purchased the single set c of properties of contacts at the time t," which has no transaction information which indicates which other sets of properties of contacts were purchased by the user u along with the single set c of properties of contacts at the time t. That is, if a transaction was in the form (u,C,t), then the database system created |C| triples in the form (u,c,t) for each set c of properties of contacts in the set C. The database system's first approach below may be seen as an approximation to market basket analysis which captures high confidence association rules X→Y in which |X|=|Y|=1 in a directed graph, and uses Bayesian inference under a conditional independence assumption to estimate P(j|C) when |C|>1. The first model is for the case P(j|i), which covers the case of |C| approximately, as described below. The model is a directed graph, whose nodes are contacts. There is a directed arc from the node i to the node j with the associated weight P(j|i). Each node i in the directed graph also has an associated probability P(i). P(i) is the probability of the set i of properties of contacts being purchased. In a practical realization with a directed graph that has tens of thousands of nodes, the database system may keep the directed graph sparse. Specifically, for any given set i of properties of contacts, the database system may cap the number of outgoing directed arcs to some constant, of the directed arcs with the highest values of P(j|i).) For the database system to estimate P(j|C), when |C|>1, by Bayes rule: P(j|C)=P(C|j)*P(j)/P(C) [equation 1]

By assuming conditional independence of the elements of the set C given the set j of properties of contacts, and by observing that P(C) does not depend on j, the database system may use the following equation 2:

$$P(j)*\text{product}\_\{c \text{ in } C\}P(c|j) \quad [\text{equation 2}]$$

The equation 2 is monotone in P(j|C), can be used to rank the candidate sets j of properties of contacts instead of P(j|C), and is computable from the node and edge (arc) weights of the directed graph. A complete directed graph has P(c|j) for every set c of properties of contacts and set j of properties of contacts. In practice, a directed graph is highly unlikely to be complete because that would require too much storage. Therefore, a node may only have a small number of out-neighbors, the highest scoring neighbors. So in the equation 2, it is possible that the directed graph does not have a directed arc from the set j of properties of contacts to the set c of properties of contacts for some pairs (c, j). In such cases, the database system approximates P(c|j) by P(c).

For a given C, where |C|>1, the database system finds the set S(C) of candidates to score for recommendation as follows. Let I(v) denote the set of in-neighbors of vertex v. The set of candidates is:

$$S(C)=\cup I(c)-C \text{ for } c \in C \quad [\text{equation 3}]$$

The database system scores each candidate set j of properties of contacts in the set S(C) against the set C, and ranks each candidate contact accordingly. The database system may use an optimization that is sometimes more efficient when the set C is large. For j∈S(C), the database system defines:

$$d(j,C)=|O(j) \cap C| \quad [\text{equation 4}]$$

d(j,C) is the number of out-neighbors of the set j of properties of contacts that are in the set C. Generally, the higher d(j,C) is, the higher the score defined by the equation 2 will be. In view of this, it makes sense for the database system to find only that subset of S(C) in which, for every j∈S(C), d(j,C) is sufficiently high. The equation 5 below is a more efficient variant of the equation 4 for this purpose.

$$S(C)=\cup I(c1) \cap I(c2)-C \text{ for } c1,c2 \in C \quad [\text{equation 5}]$$

When the database system executes the equation 5, the database system only finds those j for which d(j,C)≥2, which is depicted in FIG. 5 and described below.

FIG. 5 illustrates a block diagram of an example portion of a yet another directed graph 500 for bulk contact recommendations based on property purchase history, under an embodiment. In FIG. 2, C={A, B, and F}. When the database system executes the equation 5, the database system finds S(C)={O, R, and S}. The algorithm can be further optimized to the following:

```
S(C) = { } // empty set
for k = |C| down to 1
    for each k-element subset Ck of C
        S(C) = S(C) ∪ (∩ I(i)) for i∈Ck
    end
end
S(C) = S(C) - C
```

Furthermore, when the database system adds an element to the set S(C) in this algorithm, the database system also adds the element to an auxiliary data structure, a hash whose keys are values of k. The value associated with a key is the candidate set j of properties of contacts in the set S(C) whose d(j,C) equals k. This data structure, and updates to it, are not described above, but are illustrated in the table 1 below, under the column titled H.

TABLE 1

Illustration of the above algorithm on the directed graph of FIG. 5.

| K | Ck | ∩ I(i) i∈Ck | S(C) | H |
|---|---|---|---|---|
| 3 | {A, B, F} | empty set | empty set | empty hash |
| 2 | {A, B} | {M} | {M} | {2 → {M}} |
| 2 | {B, F} | empty set | | |
| 2 | {A, F} | {R, S} | {M, R, S} | {2 → {M, R, S}} |
| 1 | {A} | {M, O, R, S} | {M, O, R, S} | {2 → {M, R, S}, 1 → {O}} |
| 1 | {B} | {M} | | |
| 1 | {F} | {R, S} | | |

The algorithm's final output of interest is the last value of column H. In the table 1 case, this would be {2→{M,R,S}, 1→{O}}. This output suggests that the database system wants to score M, R, and S first, each against C={A,B, and F}, and O last, as appropriate, because each of the candidate sets {M, R, and S} of properties of contacts have 2 outgoing directed arcs to sets of properties of contacts in the set {A, B, and F} of properties of contacts, while the candidate set O of properties of contacts has only 1 outgoing directed arc to the sets {A, B, and F} of contacts. In practice, a streaming implementation of this algorithm could be easily made to produce key-value pairs in the order: 2→{M,R,S} 1→{O}. The database system could then process, or score, the elements in the key-value pairs in the order presented, and stop if too much time has been spent, thereby giving priority to candidate sets of properties of contacts with more outgoing directed arcs to the sets of properties of contacts in the current user-purchase set of properties of contacts.

Using non-basket purchased data, a sensible and easy estimate of P(j|i) is the fraction of those users who purchased the set i of properties of contacts who also purchased the set j of properties of contacts. The obvious estimate of P(i) is the fraction of all purchases, i.e. of triples (u, c, t), in which the set c of properties of contacts is the value i. Arguably, recent purchases are more significant than older purchases. Therefore, the database system may use a recency-weighted version of the estimates. First, the database system transforms the time t in a triple (u, c, t) to a recency-weight wt=exp(-(now-t)·days/Q). Here Q is a suitably chosen positive constant that controls the exponential decay rate. Q=715.0 has been found to be a good choice. The alias wuc≡wt is used for notational convenience below. This assumes that the pair (u, c) does not occur in more than one triple, which is a reasonable assumption. The recency-weighted estimate equations are below. R(i) is the estimate of P(i); R(j|i) is the estimate of P(j|i), and u~c denotes that the user u purchased the set c of properties of contacts.

$$R(i)=\Sigma wui \text{ for } u:u\sim i/\Sigma wuc \text{ for } u,c:u\sim c \quad [\text{equation 6}]$$

$$R(j|i)=\Sigma \sqrt{wuiwuj} \text{ for } u:u\sim i \text{ \& } u\sim j/\Sigma wui \text{ for } u:u\sim i \quad [\text{equation 7}]$$

The R(i) formula in the equation 6 needs no explanation because it is transparent. The R(j|i) formula in the equation 7 requires some explanation. The numerator in R(j|i) sums over all unordered pairs {i, j} of the sets of properties of contacts purchased by the user u. The set i of properties of contacts may be purchased by the user u at a different time than the set j of properties of contacts was purchased by the user u. That is, wui and wuj may have different values. The database system may aggregate these values into a single sensible number by taking their geometric mean. One interesting characteristic that R(j|i) exhibits is presented in the following extreme example: n users have purchased contacts in the set i of properties of contacts, all 5 years ago, and the same n users purchased contacts in the set j of properties of contacts today. Therefore, R(j|i) equals n, which may seem strange. However, this result is not unreasonable because if the same n users who purchased contacts in the set i of properties of contacts five years back also purchased contacts in the set j of properties of contacts today, then the strength of the association i→j should indeed be very high.

In the previous section, the estimates of P(j|i) and P(i) were defined from non-basket purchased data. In practice, such data from which to construct these estimates is often large. For example, some databases may have about 300 million triples (u, c, t) on about 40 million contacts, such that there are about 40 million distinct values of c. Therefore, a corresponding constructed graph may have roughly 40 million nodes. Viewed naively, all ordered pairs of nodes have to be considered for directed arc placement and associated directed arc weight calculation. For any given ordered pair (i, j) of nodes, the estimate of P(j|i) involves computing the fraction of users who purchased a contact in the set i of properties of contacts who also purchased a contact in the set j of properties of contacts. Therefore, the naive way of building this directed graph is un-scalable in practice. The challenges of building this directed graph may be formulated in a map reduce paradigm, and use a software framework for storage and large-scale processing of data sets, such as Hadoop®, for its solution. The solution uses two map-reduce phases. The first map-reduce phase groups the input set {(u, c, t)} of triples by the user u, with the tuples for any fixed user sorted in order of non-increasing time. This results in a set of u→→<c1, . . . , ck> pairs, where u is a user and <c1, . . . , ck> is the list of sets of properties of contacts that the user u has purchased, in order of non-increasing time. This ordering is done because for some users, the value k is in the thousands. Processing this list for the purposes of computing the directed graph is extremely slow, even in a Hadoop® setting. By maintaining such lists in time sorted order, truncating very large lists favors recent purchases over older ones a sensible heuristic. The second map-reduce phase inputs the output of the reduce 1 phase, such as key-value pairs of the form u→<c1, . . . , ck>. The map 2 phase transforms such a pair to the pairs:

$$c1 \to <c1, \ldots ck>, c2 \to <c1, \ldots, ck>, \ldots, ck \to <c1, \ldots, ck> \quad [\text{equation 8}]$$

Think of ci→<c1, . . . , ck> as capturing one co-occurrence of ci with each of c1, c2, . . . , ck. The reduce 2 phase processes the pairs produced by the map 2 phase, after they have been grouped by sets of properties of contacts. Table 4 below provides an example. The reduce 2 phase outputs key-value pairs of the form:

$$ci \to *<n, cj1, p(cj1|ci), cj2, p(cj2|ci), \ldots, cjk, p(cjk|ci)> \quad [\text{equation 9}]$$

Here n is the number of purchases of sets of properties of contacts ci, <cj1, . . . , cjk> is a list of sets of properties of contacts deemed similar to the set of properties of contacts ci sorted in non-increasing order of their probabilities p(cj|ci). In a simple example, Table 2 below shows the input to the map 1 phase.

TABLE 2

Example input to the map 1 phase, in which time is shown in whole numbers, and time unit 1 is before time unit 2.

| User | Contact Set | Time |
|------|-------------|------|
| u1 | c3 | 1 |
| u1 | c1 | 2 |
| u1 | c2 | 3 |
| u2 | c4 | 2 |
| u2 | c1 | 4 |

Table 3 below shows the output of the reduce 1 phase for this input to the map 1 phase, and indicates that the user u1 purchased the set 2 of properties of contacts most recently, the set c1 of properties of contacts before then, and the set c3 of properties of contacts the earliest.

TABLE 3

Output of the reduce 1 phase.

| User | Contact Set List |
|------|------------------|
| u1 | <c2, c1, c3> |
| u2 | <c1, c4> |

Table 4 below shows the output of the map 2 phase.

TABLE 4

Output of the map 2 phase.

| Key | Value |
|-----|-------|
| c2 | <c2, c1, c3> |
| c1 | <c2, c1, c3> |
| c3 | <c2, c1, c3> |
| c1 | <c1, c4> |
| c4 | <c1, c4> |

Table 5 below shows the output of the reduce 2 phase. The key is dropped from each value when present.

TABLE 5

Output of the reduce 2 phase.

| Key | Value |
|-----|-------|
| c1 | <2, c2, 0.5, c3, 0.5, c4, 0.5> |
| c2 | <1, c1, 1, c3, 1> |
| c3 | <1, c1, 1, c2, 1> |
| c4 | <1, c1, 1> |

The first row of the table 5 is read as "2 users purchased a contact in the set c1 of properties of contacts, a probability of 0.50 of these users (one user) also purchased a contact in the set c2 of properties of contacts, a probability of 0.50 of these users (one user) also purchased a contact in the set c3 of properties of contacts, and a probability of 0.50 of these users (one user) also purchased a contact in the set c4 of properties of contacts."

The probabilistic version ranks the candidate set j of properties of contacts to recommend for given set C of properties of contacts by P(j|C). A compelling alternative is the so-called lift, defined as P(j|C)/P(j). Lift is much larger than 1.0 when P(j|C) is much larger than P(j). In view of this, lift based ranking can favor discoverability over popularity. The decision of whether to rank by confidence or by lift can be made dynamically since the directed graph stores the statistics to compute both confidence and lift. In view of this, A-B runtime testing of these two choices is convenient.

A company of a contact is known generally for most databases of contacts. Consider the data set of type 2, a set of (u, c, t) triples where c denotes a contact. The database system may replace c in each triple by the company cm of c, and generate a directed graph based on this new data, exactly as before. This directed graph's nodes are companies, P(i) is the fraction of all contact purchases triples (u, cm, t) that have been of contacts at company i, and P(j|i) is the fraction of users who purchased contacts in company i who also purchased contacts in company j. This directed graph may be used to recommend companies. The database system may provide recommendations to users who are purchasing contacts at a certain company i to consider purchasing recommended companies j for which P(j|i) is sufficiently large. Ranking by the lift based alternative may be compelling here because discoverability of nonobvious relationships between companies is especially valued.

System Overview

Figure 6:
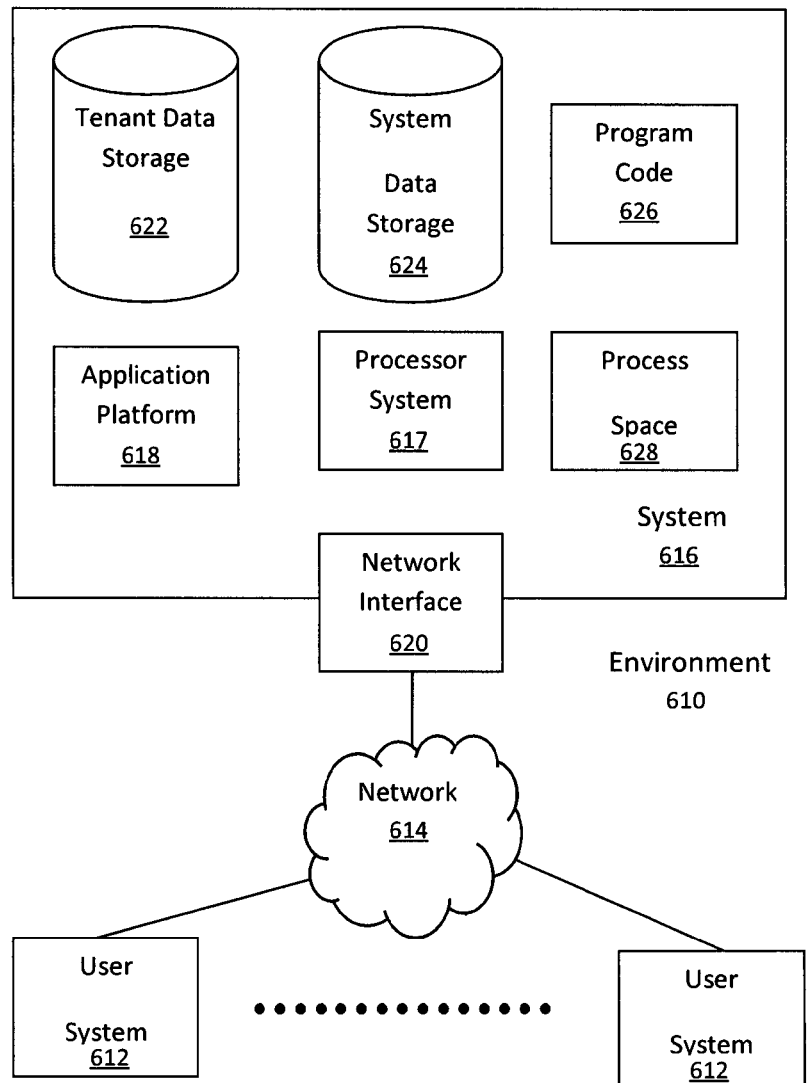
FIG. 6 illustrates a block diagram of an example of an environment wherein an on-demand database service might be used.

FIG. 6 illustrates a block diagram of an environment 610 wherein an on-demand database service might be used. The environment 610 may include user systems 612, a network 614, a system 616, a processor system 617, an application platform 618, a network interface 620, a tenant data storage 622, a system data storage 624, program code 626, and a process space 628. In other embodiments, the environment 610 may not have all of the components listed and/or may have other elements instead of, or in addition to, those listed above.

The environment 610 is an environment in which an on-demand database service exists. A user system 612 may be any machine or system that is used by a user to access a database user system. For example, any of the user systems 612 may be a handheld computing device, a mobile phone, a laptop computer, a work station, and/or a network of computing devices. As illustrated in FIG. 6 (and in more detail in FIG. 7) the user systems 612 might interact via the network 614 with an on-demand database service, which is the system 616.

An on-demand database service, such as the system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 616" and the "system 616" will be used interchangeably herein. A database image may include one or more database objects. A relational database management system (RDMS) or the equivalent may execute storage and retrieval of information against the database object(s). The application platform 618 may be a framework that allows the applications of the system 616 to run, such as the hardware and/or software, e.g., the operating system. In an embodiment, the on-demand database service 616 may include the application platform 618 which enables creation, managing and executing one or more applications developed by the provider of the on-demand database service, users accessing the on-demand database service via user systems 612, or third party application developers accessing the on-demand database service via the user systems 612.

The users of the user systems 612 may differ in their respective capacities, and the capacity of a particular user system 612 might be entirely determined by permissions (permission levels) for the current user. For example, where a salesperson is using a particular user system 612 to interact with the system 616, that user system 612 has the capacities allotted to that salesperson. However, while an administrator is using that user system 612 to interact with the system 616, that user system 612 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 614 is any network or combination of networks of devices that communicate with one another. For example, the network 614 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 612 might communicate with the system 616 using TCP/IP and, at a higher network level, use other common Internet protocols to communicate, such as HTTP, FTP, AFS, WAP, etc. In an example where HTTP is used, the user systems 612 might include an HTTP client commonly referred to as a "browser" for sending and receiving HTTP messages to and from an HTTP server at the system 616. Such an HTTP server might be implemented as the sole network interface between the system 616 and the network 614, but other techniques might be used as well or instead. In some implementations, the interface between the system 616 and the network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 616, shown in FIG. 6, implements a web-based customer relationship management (CRM) system. For example, in one embodiment, the system 616 includes application servers configured to implement and execute CRM software applications as well as provide related data, code, forms, webpages and other information to and from the user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 616 implements applications other than, or in addition to, a CRM application. For example, the system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of the system 616 is shown in FIG. 6, including the network interface 620, the application platform 618, the tenant data storage 622 for tenant data 623, the system data storage 624 for system data 625 accessible to the system 616 and possibly multiple tenants, the program code 626 for implementing various functions of the system 616, and the process space 628 for executing MTS system processes and tenant-specific processes, such as running applications as part of an application hosting service. Additional processes that may execute on the system 616 include database indexing processes.

Several elements in the system shown in FIG. 6 include conventional, well-known elements that are explained only briefly here. For example, each of the user systems 612 could include a desktop personal computer, workstation, laptop, PDA, cell phone, or any wireless access protocol (WAP) enabled device or any other computing device capable of interfacing directly or indirectly to the Internet or other network connection. Each of the user systems 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 612 to access, process and view information, pages and applications available to it from the system 616 over the network 614. Each of the user systems 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 616 or other systems or servers. For example, the user interface device may be used to access data and applications hosted by the system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 612 and all of its components are operator configurable using applications, such as a browser, including computer code run using a central processing unit such as an Intel Pentium® processor or the like. Similarly, the system 616 (and additional instances of an MTS, where more than one is present) and all of their components might be operator configurable using application(s) including computer code to run using a central processing unit such as the processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 616 is configured to provide webpages, forms, applications, data and media content to the user (client) systems 612 to support the access by the user systems 612 as tenants of the system 616. As such, the system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
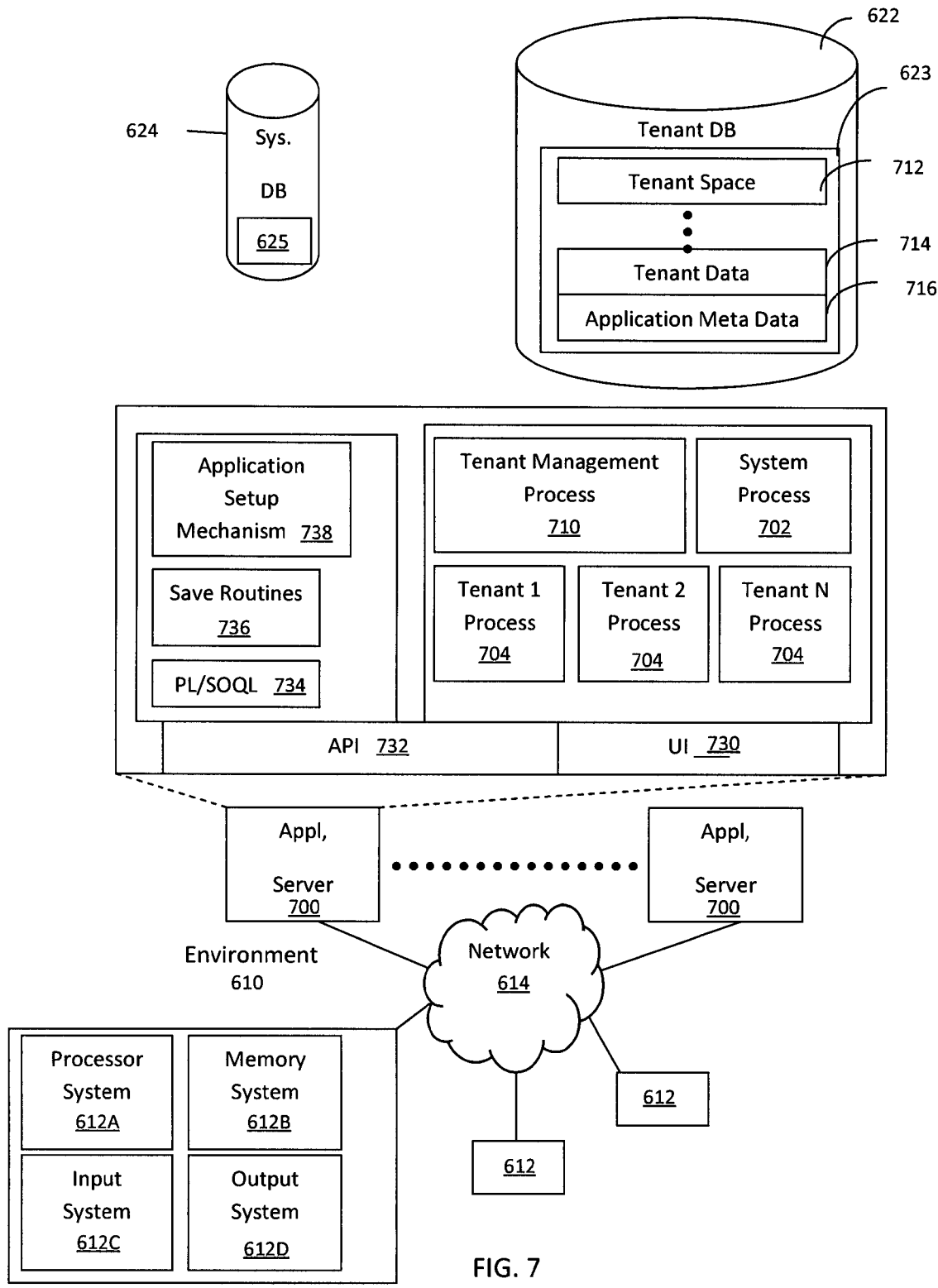
FIG. 7 illustrates a block diagram of an embodiment of elements of FIG. 6 and various possible interconnections between these elements.

FIG. 7 also illustrates the environment 610. However, in FIG. 7 elements of the system 616 and various interconnections in an embodiment are further illustrated. FIG. 7 shows that the each of the user systems 612 may include a processor system 612A, a memory system 612B, an input system 612C, and an output system 612D. FIG. 7 shows the network 614 and the system 616. FIG. 7 also shows that the system 616 may include the tenant data storage 622, the tenant data 623, the system data storage 624, the system data 625, a User Interface (UI) 730, an Application Program Interface (API) 732, a PL/SOQL 734, save routines 736, an application setup mechanism 738, applications servers $700_1$-$700_N$, a system process space 702, tenant process spaces 704, a tenant management process space 710, a tenant storage area 712, a user storage 714, and application metadata 716. In other embodiments, the environment 610 may not have the same elements as those listed above and/or may have other elements instead of, or in addition to, those listed above.

The user systems 612, the network 614, the system 616, the tenant data storage 622, and the system data storage 624 were discussed above in FIG. 6. Regarding the user systems 612, the processor system 612A may be any combination of one or more processors. The memory system 612B may be any combination of one or more memory devices, short term, and/or long term memory. The input system 612C may be any combination of input devices, such as one or more keyboards, mice, trackballs, scanners, cameras, and/or interfaces to networks. The output system 612D may be any combination of output devices, such as one or more monitors, printers, and/or interfaces to networks. As shown by FIG. 7, the system 616 may include the network interface 620 (of FIG. 6) implemented as a set of HTTP application servers 700, the application platform 618, the tenant data storage 622, and the system data storage 624. Also shown is the system process space 702, including individual tenant process spaces 704 and the tenant management process space 710. Each application server 700 may be configured to access tenant data storage 622 and the tenant data 623 therein, and the system data storage 624 and the system data 625 therein to serve requests of the user systems 612. The tenant data 623 might be divided into individual tenant storage areas 712, which can be either a physical arrangement and/or a logical arrangement of data. Within each tenant storage area 712, the user storage 714 and the application metadata 716 might be similarly allocated for each user. For example, a copy of a user's most recently used (MRU) items might be stored to the user storage 714. Similarly, a copy of MRU items for an entire organization that is a tenant might be stored to the tenant storage area 712. The UI 730 provides a user interface and the API 732 provides an application programmer interface to the system 616 resident processes to users and/or developers at the user systems 612. The tenant data and the system data may be stored in various databases, such as one or more Oracle™ databases.

The application platform 618 includes the application setup mechanism 738 that supports application developers' creation and management of applications, which may be saved as metadata into the tenant data storage 622 by the save routines 736 for execution by subscribers as one or more tenant process spaces 704 managed by the tenant management process 710 for example. Invocations to such applications may be coded using the PL/SOQL 734 that provides a programming language style interface extension to the API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 716 for the subscriber making the invocation and executing the metadata as an application in a virtual machine.

Each application server 700 may be communicably coupled to database systems, e.g., having access to the system data 625 and the tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, the system 616 is multi-tenant, wherein the system 616 handles storage of, and access to, different objects, data and applications across disparate users and organizations.

As an example of storage, one tenant might be a company that employs a sales force where each salesperson uses the system 616 to manage their sales process. Thus, a user might maintain contact data, leads data, customer follow-up data, performance data, goals and progress data, etc., all applicable to that user's personal sales process (e.g., in the tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 616 might also maintain system level data usable by multiple tenants or other data. Such system level data might include industry reports, news, postings, and the like that are sharable among tenants.

In certain embodiments, the user systems 612 (which may be client systems) communicate with the application servers 700 to request and update system-level and tenant-level data from the system 616 that may require sending one or more queries to the tenant data storage 622 and/or the system data storage 624. The system 616 (e.g., an application server 700 in the system 616) automatically generates one or more SQL statements (e.g., one or more SQL queries) that are designed to access the desired information. The system data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for bulk contact recommendations based on attribute purchase history, the system comprising:
one or more processors; and
a non-transitory computer readable medium storing a plurality of instructions, which when executed, cause the one or more processors to:
create, by a database system, a directed graph of a plurality of nodes in which at least some of the plurality of nodes are connected by a plurality of directed arcs, wherein a number of outgoing directed arcs from each node is limited to a maximum number of outgoing directed arcs based on a dynamically changing corresponding conditional probability associated with each potential outgoing directed arc, each of the outgoing directed arcs being dynamically created based upon each dynamically changing corresponding conditional probability;
identify, by the database system, a first compound attribute associated with a first plurality of contacts purchased by a current user, wherein the first compound attribute comprises a first attribute associated with a first value and also comprises a second attribute associated with a second value;
identify, by the database system, a directed arc from a first node to a second node, wherein the directed arc is associated with a conditional probability that previous users who purchased a first contact associated with the first compound attribute also purchased a second contact associated with a second compound attribute, wherein the second compound attribute comprises the first attribute, which is associated with a third value which matches the first value, and also comprises the second attribute, which is associated with a fourth value, which lacks a match with the second value; and
output, by the database system, a recommendation for the current user to purchase a second plurality of contacts associated with the second compound attribute based on determination that the conditional probability exceeds a probability threshold in response to the current user purchasing the first plurality of contacts.

2. The system of claim 1, wherein the first attribute comprises a third attribute and a fourth attribute, and wherein the first value comprises a fifth value associated with the third attribute and also comprises a sixth value associated with the fourth attribute.

3. The system of claim 1, wherein the conditional probability that previous users who purchased the first contact associated with the first compound attribute also purchased the second contact associated with the second compound attribute is adjusted for purchase recency.

4. The system of claim 1, wherein the third value matches the first value based on at least one of the third value comprising the first value based on and a similarity score equating the third value with the first value.

5. The system of claim 1, wherein the probability threshold is one of based on a pre-determined threshold value and based on another conditional probability that previous users who purchased the first contact associated with the first compound attribute also purchased a third contact associated with a third compound attribute, wherein the third compound attribute comprises the first attribute, which is associated with a seventh value which matches the first value, and also comprises the second attribute, which is associated with an eighth value, which lacks a match with the second value.

6. A computer program product comprising computer-readable program code to be executed by one or more processors when retrieved from a non-transitory computer-readable medium, the program code including instructions to:
    create, by a database system, a directed graph of a plurality of nodes in which at least some of the plurality of nodes are connected by a plurality of directed arcs, wherein a number of outgoing directed arcs from each node is limited to a maximum number of outgoing directed arcs based on a dynamically changing corresponding conditional probability associated with each potential outgoing directed arc, each of the outgoing directed arcs being dynamically created based upon each dynamically changing corresponding conditional probability;
    identify, by the database system, a first compound attribute associated with a first plurality of contacts purchased by a current user, wherein the first compound attribute comprises a first attribute associated with a first value and also comprises a second attribute associated with a second value;
    identify, by the database system, a directed arc from a first node to a second node, wherein the directed arc is associated with a conditional probability that previous users who purchased a first contact associated with the first compound attribute also purchased a second contact associated with a second compound attribute, wherein the second compound attribute comprises the first attribute, which is associated with a third value which matches the first value, and also comprises the second attribute, which is associated with a fourth value, which lacks a match with the second value; and
    output, by the database system, a recommendation for the current user to purchase a second plurality of contacts associated with the second compound attribute based on determination that the conditional probability exceeds a probability threshold in response the current user purchasing the first plurality of contacts.

7. The computer program product of claim 6, wherein the first attribute comprises a third attribute and a fourth attribute, and wherein the first value comprises a fifth value associated with the third attribute and also comprises a sixth value associated with the fourth attribute.

8. The computer program product of claim 6, wherein the conditional probability that previous users who purchased the first contact associated with the first compound attribute also purchased the second contact associated with the second compound attribute is adjusted for purchase recency.

9. The computer program product of claim 6, wherein the third value matches the first value based on at least one of the third value comprising the first value and based on a similarity score equating the third value with the first value.

10. The computer program product of claim 6, wherein the probability threshold is one of based on a pre-determined threshold value and based on another conditional probability that previous users who purchased the first contact associated with the first compound attribute also purchased a third contact associated with a third compound attribute, wherein the third compound attribute comprises the first attribute, which is associated with a seventh value which matches the first value, and also comprises the second attribute, which is associated with an eighth value, which lacks a match with the second value.

11. A computer-implemented method for bulk contact recommendations based on attribute purchase history, the method comprising:
    creating, by a database system, a directed graph of a plurality of nodes in which at least some of the plurality of nodes are connected by a plurality of directed arcs, wherein a number of outgoing directed arcs from each node is limited to a maximum number of outgoing directed arcs based on a dynamically changing corresponding conditional probability associated with each potential outgoing directed arc, each of the outgoing directed arcs being dynamically created based upon each dynamically changing corresponding conditional probability;
    identifying, by the database system, a first compound attribute associated with a first plurality of contacts purchased by a current user, wherein the first compound attribute comprises a first attribute associated with a first value and also comprises a second attribute associated with a second value;
    identifying, by the database system, a directed arc from a first node to a second node, wherein the directed arc is associated with a conditional probability that previous users who purchased a first contact associated with the first compound attribute also purchased a second contact associated with a second compound attribute, wherein the second compound attribute comprises the first attribute, which is associated with a third value which matches the first value, and also comprises the second attribute, which is associated with a fourth value, which lacks a match with the second value; and
    outputting, by the database system, a recommendation for the current user to purchase a second plurality of contacts associated with the second compound attribute based on determination that the conditional probability exceeds a probability threshold in response the current user purchasing the first plurality of contacts.

12. The computer-implemented method of claim 11, wherein the first attribute comprises a third attribute and a fourth attribute, and wherein the first value comprises a fifth value associated with the third attribute and also comprises a sixth value associated with the fourth attribute.

13. The computer-implemented method of claim 11, wherein the conditional probability that previous users who purchased the first contact associated with the first compound attribute also purchased the second contact associated with the second compound attribute is adjusted for purchase recency.

14. The computer-implemented method of claim 11, wherein the third value matches the first value based on at least one of the third value comprising the first value and based on a similarity score equating the third value with the first value.

15. The computer-implemented method of claim 11, wherein the probability threshold is one of based on a pre-determined threshold value and based on another conditional probability that previous users who purchased the first contact associated with the first compound attribute also purchased a third contact associated with a third compound attribute, wherein the third compound attribute comprises the first attribute, which is associated with a seventh value which matches the first value, and also comprises the second attribute, which is associated with an eighth value, which lacks a match with the second value.

16. A system comprising:
    a processor-based application, which when executed on a computer, will cause the processor to:
    create, by a database system, a directed graph of a plurality of nodes in which at least some of the plurality of nodes are connected by a plurality of directed arcs, wherein a number of outgoing directed arcs from each node is limited to a maximum number of outgoing directed arcs based on a dynamically changing corresponding conditional probability associated with each potential outgoing directed arc, each of the outgoing directed arcs being dynamically created based upon each dynamically changing corresponding conditional probability;

identify, by the database system, a first compound attribute associated with a first plurality of contacts purchased by a current user, wherein the first compound attribute comprises a first attribute associated with a first value and also comprises a second attribute associated with a second value;

identify, by the database system, a directed arc from a first node to a second node, wherein the directed arc is associated with a conditional probability that previous users who purchased a first contact associated with the first compound attribute also purchased a second contact associated with a second compound attribute, wherein the second compound attribute comprises the first attribute, which is associated with a third value which matches the first value, and also comprises the second attribute, which is associated with a fourth value, which lacks a match with the second value; and output, by the database system, a recommendation for the current user to purchase a second plurality of contacts associated with the second compound attribute based on determination that the conditional probability exceeds a probability threshold in response the current user purchasing the first plurality of contacts.

17. The system of claim 16, wherein the first attribute comprises a third attribute and a fourth attribute, and wherein the first value comprises a fifth value associated with the third attribute and also comprises a sixth value associated with the fourth attribute.

18. The system of claim 16, wherein the conditional probability that previous users who purchased the first contact associated with the first compound attribute also purchased the second contact associated with the second compound attribute is adjusted for purchase recency.

19. The system of claim 16, wherein the third value matches the first value based on at least one of the third value comprising the first value and based on a similarity score equating the third value with the first value.

20. The system of claim 16, wherein the probability threshold is one of based on a pre-determined threshold value and based on another conditional probability that previous users who purchased the first contact associated with the first compound attribute also purchased a third contact associated with a third compound attribute, wherein the third compound attribute comprises the first attribute, which is associated with a seventh value which matches the first value, and also comprises the second attribute, which is associated with an eighth value, which lacks a match with the second value.

* * * * *